May 21, 1963 W. N. POWELL 3,090,179
AIR FILTER AND HUMIDIFIER
Filed Dec. 29, 1959 2 Sheets-Sheet 1
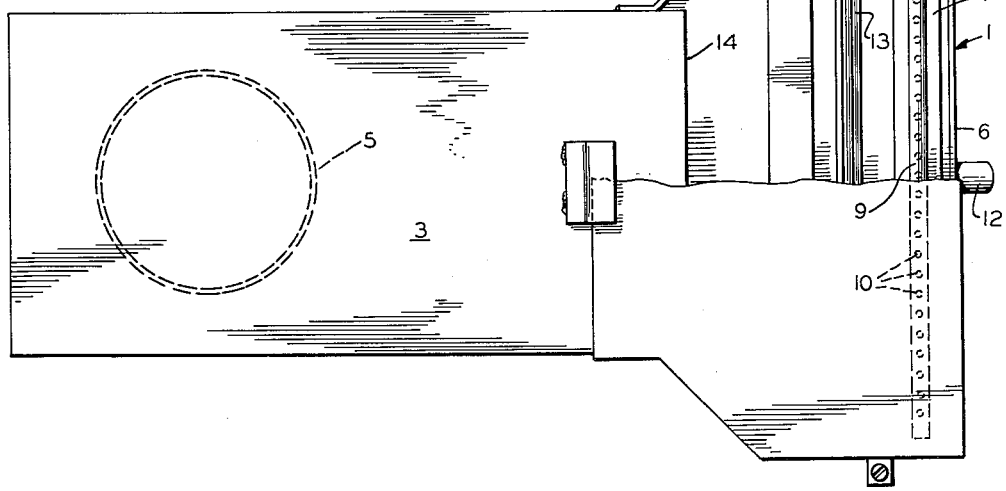
FIG_1
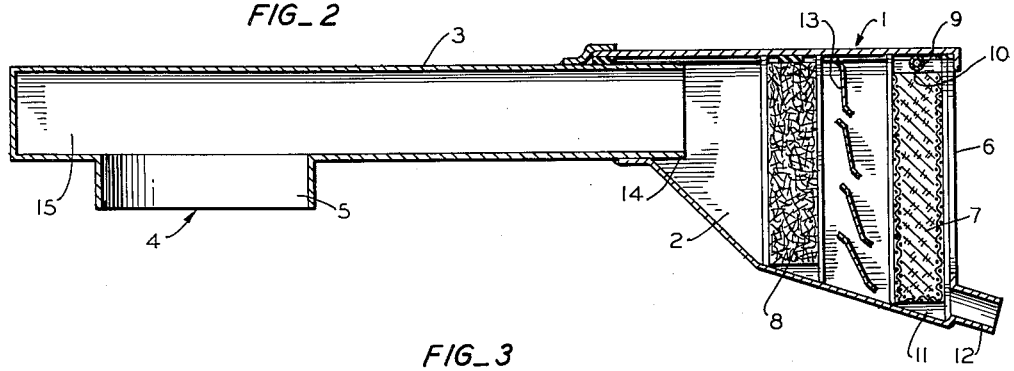
FIG_2
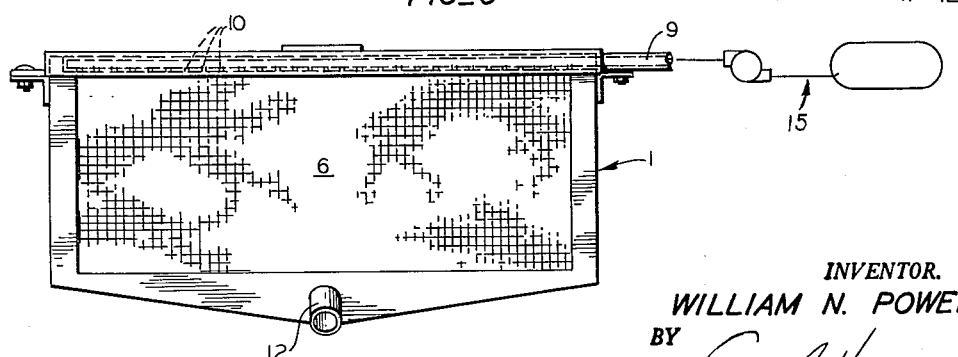
FIG_3
INVENTOR.
WILLIAM N. POWELL
BY
Carl Hoppe
ATTORNEY May 21, 1963   W. N. POWELL   3,090,179
AIR FILTER AND HUMIDIFIER
Filed Dec. 29, 1959   2 Sheets-Sheet 2
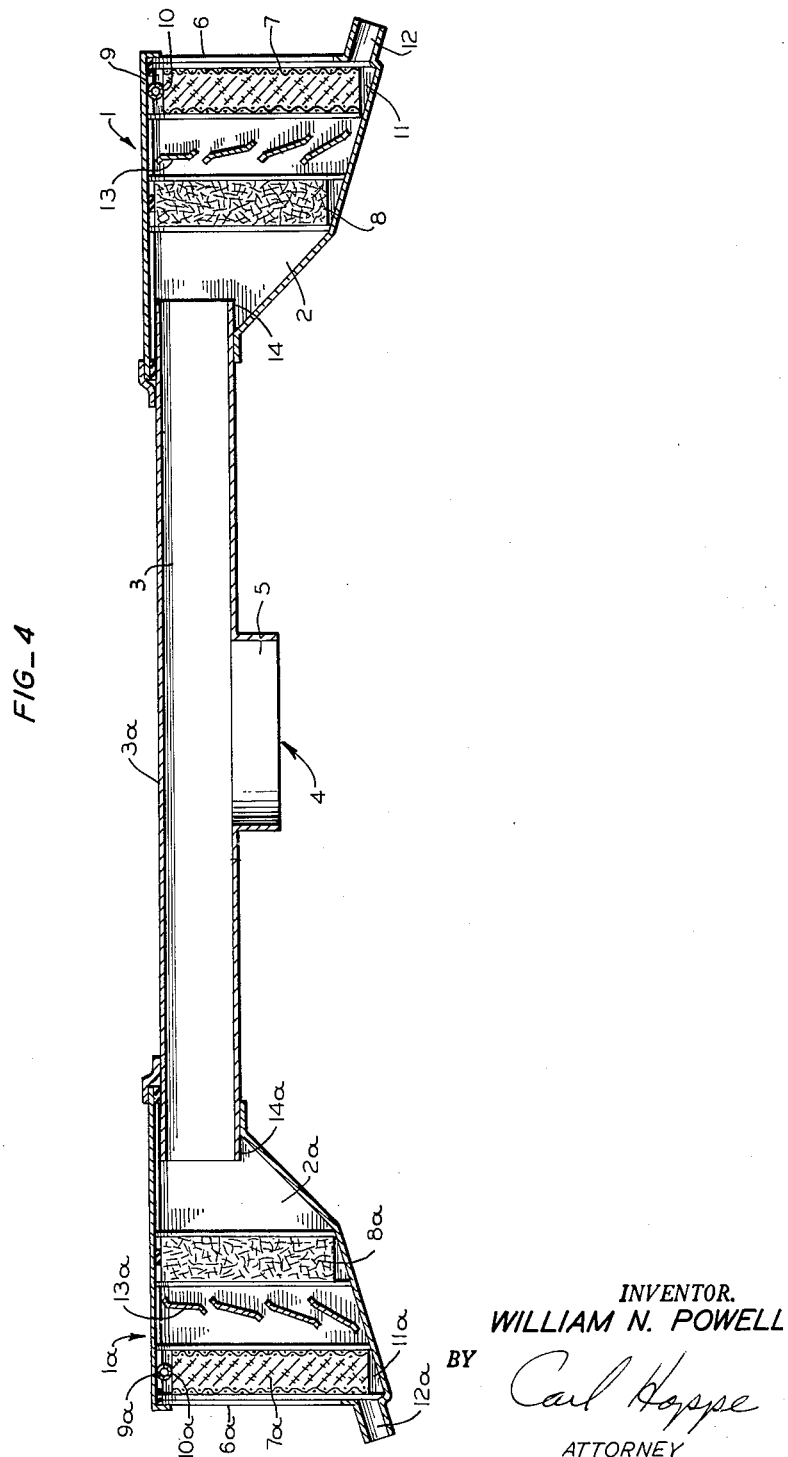
INVENTOR.
WILLIAM N. POWELL
BY Carl Hoppe
ATTORNEY

3,090,179
Patented May 21, 1963

3,090,179
AIR FILTER AND HUMIDIFIER
William N. Powell, Wheatland, Calif.
Filed Dec. 29, 1959, Ser. No. 862,591
5 Claims. (Cl. 55—233)

This invention relates generally to air filters and humidifiers for internal combustion engines and, more particularly, relates to an improved air filter and humidifier utilizing a water moistened viscous filtering medium for filtering and humidifying combustion air and utilizing an absorbent filtering medium for trapping entrained water droplets.

It is well-known that humidification of the intake air for internal combustion engines improves engine performance. Among the beneficial results of humidification are an improvement in anti-knock characteristics of the engine, a decrease in specific fuel consumption and an increase in power. Thus, for example, direct injection of a spray of water into the intake manifold of the engine is a feature sometimes incorporated in automotive engines.

The present invention covers an improved air filter and humidifier of the type disclosed in my United States Patent No. 2,843,216 for Air Filter and Humidifier, issued on July 15, 1958. This type of unit employs a non-absorbent filtering medium such as glass wool, over which water is sprayed to moisten the filter and to provide a viscous fluid for entrapping dust particles and the like, while at the same time exposing considerable water surface area to the intake air so as to promote evaporation of the water into the air stream. The present invention, while operating on the general principles shown in the foregoing patent, includes novel features which heretofore have not been disclosed.

Among these features and one object of the present invention is a cross-flow arrangement of elements as distinguished from the axial flow design disclosed in Patent No. 2,843,216, which reduces the pressure loss in the filter and humidifier.

Another object of this invention is to provide a baffle between the viscous filtering medium and the absorbent filtering medium to distribute the intake air uniformly over the entire absorbent filter no matter what the instantaneous engine air demand may be.

One further object of the present invention is an arrangement of elements to provide a unit adapted for use on modern automotive vehicles having very small clearance between the carburetor intake and the hood covering the engine.

Other advantages and objects of this improved filter and humidifier will be apparent to those skilled in this art from a consideration of the following description and the accompanying drawing wherein:

FIG. 1 is a top view of an illustrative embodiment of the present invention;

FIG. 2 is a cross-sectional view of the unit showing its internal structure taken along line 2—2 of FIG. 1;

FIG. 3 is a front and end view of the unit; and

FIG. 4 is a modified unit for greater air capacity.

Referring now to the drawing wherein like numerals have been used in all figures to indicate the same part, the unit is comprised generally of a housing 1 which is substantially rectangular in cross-section and contains filtering media, a converging exit duct 2 terminating in an outlet conduit 3 which communicates with the air intake 4 of an internal combustion engine through outlet port 5.

One end of the housing 1 is provided with an inlet port 6 through which air is admitted to dual filters arranged transversely across the path of air flow. Air flows into the intake port 6, through viscous filter 7 and absorbent filter 8, and then through the converging exit duct 2 into outlet conduit 3. From the outlet conduit the air enters the carburetor of the engine as at 4.

The viscous filter 7 is a filtering medium which will withstand moisture without deterioration or compaction such as glass wool or similar material. Disposed immediately above the viscous filter 7 is a distributor tube 9 having a plurality of small perforations 10 along its under side. The distributor tube 9 is connected to a water circulating system 15 comprising generally a water pump, supply tank and feed line. Water in the feed line under a pressure greater than atmospheric is admitted to the distributor tube 9 and is sprayed out of the perforations 10 over the viscous filter 7, flowing downwardly through the filtering medium.

This water on the viscous filter 7 performs two functions; namely, that of entrapping dust or other impurities carried in the intake air stream and that of exposing considerable water surface area to the intake air stream to promote evaporation and thus humidify the air. However, the unit may be used either wet or dry. Excess water flowing off the filter 7 is contained in the sump 11 located at the bottom of the housing 1. The sump is provided with an outlet pipe 12 which returns the excess water to the water circulating system for recirculation.

Disposed between the viscous filter 7 and the absorbent filter 8 is a louvered baffle 13. Intake air passing through the viscous filter 7 is directed by the louvered baffle 13 into absorbent filter 8 and uniformly distributed over the entire filter cross-section. The absorbent filter 8 is composed of water-absorbent material such as excelsior, or the like which performs the important function of entrapping any droplets of water entrained in the air stream so that these droplets will not be carried into the engine and cause damage.

It will be observed in FIG. 2 that the baffle 13 is a louvered structure with the spaces between the louvers being larger at the bottom of the baffle than at the top. This is done to distribute the air flow equally over the filter area for varying engine loads. For low engine loads and consequent low air demand, the air passes directly through the upper part of the filters and baffle in substantially a straight path. As the engine load is increased and more air is demanded, the lower portion of the filters are utilized as well as the top portion and the air is equally distributed through the absorbent filter by the graduated louver spacing. The combined features of the cross-flow arrangement of elements and the graduated baffle spacing results in a small pressure loss at low engine loads and a relatively small loss at increased engine loads as compared with an aixal flow design shown in Patent No. 2,843,216.

It will be observed in FIG. 2 that a lip 14 is provided at the entrance to the outlet conduit 3 to catch any entrained water droplets which may creep up the sides and the bottom surface of the converging duct 2. The general slope of this section returns the droplets to the sump 11. For the same reason, the louvers of baffle 13 slope against the direction of flow of inlet air.

The illustrated outlet conduit design provides a dead ended space 15 adjacent the outlet port 5 and insures a uniform air distribution over the entire cross section of the outlet port 5 so that the air flow rate into the carburetor intake 4 is uniformly distributed.

The filtering media utilized in the present invention both tend to settle toward the bottom of the unit over a period of time. The cross-flow design disclosed herein prevents the intake air stream from aiding this settlement by further compacting the filtering media. This overcomes an inherent disadvantage of the axial flow unit disclosed in Patent No. 2,843,216.

A modified unit is illustrated in FIG. 4 for larger air capacities required by late model automobiles wherein the unit of FIGS. 1 and 2 is duplicated, having a second housing 1a and outlet conduit 3a supplying air to the outlet port 5 in addition to that supplied by outlet conduit 3. Housing 1a has a similar converging exit duct 2a terminating in conduit 3a; is provided with a similar intake port 6a, viscous filter 7a, absorbent filter 8a, and louvered baffle 13a together with a perforated distributor tube 9a, 10a connected to the water circulating system for moistening viscous filter 7a only. Excess water is returned to the system through sump 11a and outlet pipe 12a.

Housings 1 and 1a with their respective appurtenances function in parallel supplying to the air intake 4 approximately twice the quantity of filtered and humidified air as is provided by the single unit of FIG. 1 having identical dimensions.

The present improved devices have been described in some detail for purposes of clarity and understanding only and no unnecessary limitation should be understood therefrom, for modifications will be apparent to those skilled in this art.

I claim:

1. An air filtering and humidifying device comprising a viscous filtering medium; a water-absorbent filtering medium spaced apart from said viscous filtering medium; a housing enclosing said viscous and said water-absorbent filtering media, said housing having an inlet port and converging to an exit duct normal to said media but of lesser dimension than said media when viewed in front elevation, a louvered baffle disposed within said housing between said media and of substantially the same dimension as said media, the spacing of the louvers of said baffle which when the baffle is viewed in front elevation overlie said exit duct being less than the spacing of louvers not overlying said duct; a perforated water distributing tube mounted within said housing and only over said viscous filtering medium; and means for introducing water under pressure to said distributor tube causing water to spray out of said perforations only onto said viscous filtering medium.

2. An air filtering and humidifying device comprising a viscous filtering medium; a water-absorbent filtering medium spaced apart from said viscous filtering medium; a housing enclosing said viscous and said water-absorbent filtering media, said housing having an inlet port and converging to an exit duct normal to said media but of lesser dimension than said media when viewed in front elevation, a louvered baffle disposed within said housing between said media and of substantially the same dimension as said media, the spacing of the louvers of said baffle which when the baffle is viewed in front elevation overlie said exit duct being less than the spacing of louvers not overlying said duct; a perforated water distributing tube mounted within said housing and only over said viscous filtering medium; means for introducing water under pressure to said distributor tube causing water to spray out of said perforations only onto said viscous filtering medium; and a sump formed in said housing below said viscous filtering medium for containing excess water flowing from said viscous filtering medium.

3. An air filtering and humidifying device comprising a viscous filtering medium; a water-absorbent filtering medium spaced apart from said viscous filtering medium; a housing enclosing said viscous and said water-absorbent filtering media, said housing having an inlet port and converging to an exit duct normal to said media but of lesser dimension than said media when viewed in front elevation, a louvered baffle disposed within said housing between said media and of substantially the same dimension as said media, the spacing of the louvers of said baffle which when the baffle is viewed in front elevation overlie said exit duct being less than the spacing of louvers not overlying said duct; a perforated water distributing tube mounted within said housing and only over said viscous filtering medium; and means for introducing water under pressure to said distributor tube causing water to spray out of said perforations only onto said viscous filtering medium.

4. An air filtering and humidifying device according to claim 1 in which said viscous filtering medium is glass wool and said water-absorbent filtering medium is wood excelsior.

5. An air filtering and humidifying device according to claim 3 in which said viscous filtering medium is glass wool and said water-absorbent filtering medium is wood excelsior.

References Cited in the file of this patent

UNITED STATES PATENTS

| | | |
|---|---|---|
| 1,079,849 | Ernst | Nov. 25, 1913 |
| 1,187,208 | Wahl | June 13, 1916 |
| 1,522,111 | Frank-Philipson | Jan. 6, 1925 |
| 1,966,280 | Bingman | July 10, 1934 |
| 1,968,778 | Caldwell | July 31, 1934 |
| 2,158,294 | Long | May 16, 1939 |
| 2,197,004 | Myers | Apr. 16, 1940 |
| 2,310,118 | Reinhardt | Feb. 2, 1943 |
| 2,843,216 | Powell | July 15, 1958 |

FOREIGN PATENTS

| | | |
|---|---|---|
| 22,067 | Australia | Nov. 7, 1935 |
| 618,431 | France | Dec. 13, 1926 |